M. POWELL.
Wagon Brake.
No. 101,308. Patented March 29, 1870.
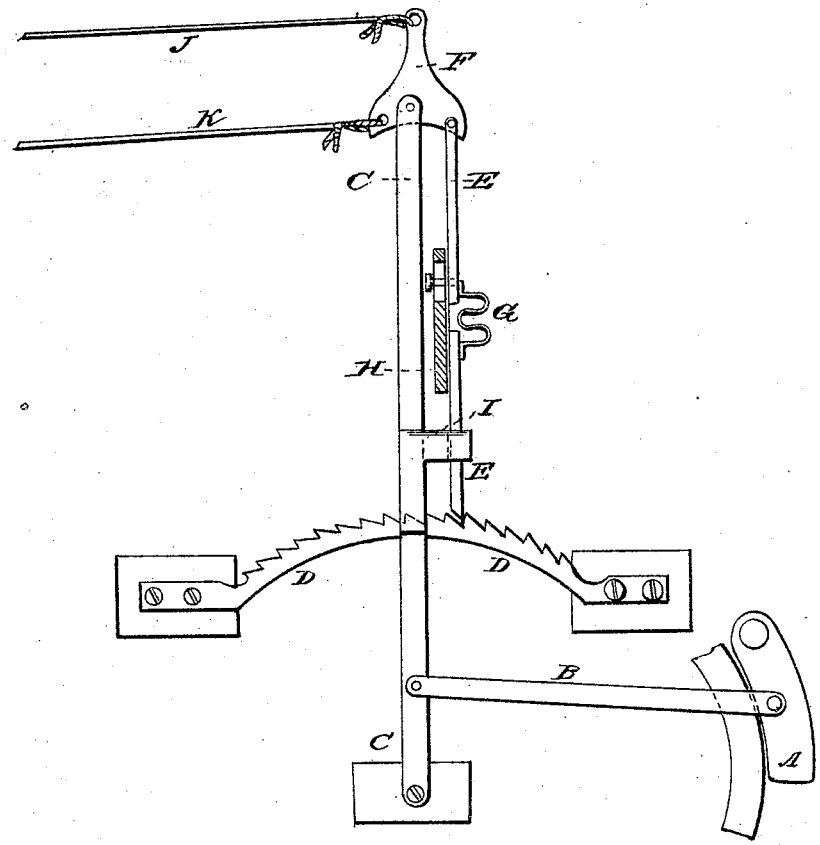

United States Patent Office.

MICHAEL POWELL, OF UMATILLA, OREGON.

Letters Patent No. 101,308, dated March 29, 1870.

IMPROVEMENT IN WAGON-BRAKES.

The Schedule referred to in these Letters Patent and making part of the same

*To all whom it may concern:*

Be it known that I, MICHAEL POWELL, of Umatilla, in the county of Umatilla and State of Oregon, have invented a new and useful Improvement in Wagon-Brakes; and I do hereby declare that the following is a full, clear, and exact description thereof, which will enable others skilled in the art to make and use the same, reference being had to the accompanying drawings forming part of this specification, in which—

The figure is a side view of my improved brake.

This invention relates to wagon-brakes; and consists in certain improvements thereon, which will be more particularly specified hereinafter.

A represents a brake-shoe, which is pivoted to the frame of the wagon or to a brake-bar connected with said frame.

B is a bar or lever, one end of which is connected with the brake-shoe A or with the brake-bar to which said brake-shoe is pivoted, and the other end of which is pivoted to the lever C.

The lower end of the lever C is pivoted to the wagon-frame or to some other support attached to said wagon-frame.

The lever C passes up through the slot of the curved rack-bar D, which is attached to the side of the wagon-frame or body, and which has ratchet-teeth formed upon its upper or convex side to receive the engaging end of the sliding spring pawl E.

The upper end of the lever C is slotted to receive the three-armed plate F, which is pivoted at or near its middle point to the said upper end of the said lever C.

To the end of the rear arm of the plate F is pivoted the slotted upper end of the sliding pawl E, which extends down parallel with the lever C, and which is made in two parts, connected by the coiled or folded spring G.

The adjacent ends of the two parts of the pawl E are also connected by the short bar or plate H, one end of which is rigidly connected with the end of the one part and the other end of which is connected with the end of the other part by a bolt or screw which passes through a slot in the said bar or plate and into or through the said end of the said other part.

The bar or plate H allows the ends of the two parts to approach each other, compressing the spring G as the engaging end of the pawl E slides over the ratchet-teeth of the rack D and protects the spring G by receiving the draft strain when the pawl E is being raised to throw off the brake.

The lower part of the pawl E is kept in place by passing through the guide I attached to the lever C.

To the upper and forward arms of the three-armed plate F are attached two cords, J K, extending forward into such a position that they can be conveniently reached and operated by the driver to apply and throw off the brake as required.

By this construction, by pulling upon one of the cords J K the brake will be applied, and by pulling upon the other cord the brake will be thrown off, thus enabling the brake to be operated by the driver wherever he may be located.

Having thus described my invention,

I claim as new and desire to secure by Letters Patent—

1. The three-armed lever F fulcrumed upon the top of a vibrating post, C, to operate a sliding pawl, in the manner described.

2. The three-armed lever F, swinging post C, sliding detent pawl E G H, rack D, and strip B, all constructed and arranged upon a wagon, as set forth and for the purpose specified.

MICHAEL POWELL.

Witnesses:
 I. INKER,
 JOHN WILLIAMS.